United States Patent
Guttag et al.

(10) Patent No.: US 11,604,751 B1
(45) Date of Patent: Mar. 14, 2023

(54) OPTIMIZING HARDWARE DESIGN THROUGHPUT BY LATENCY AWARE BALANCING OF RE-CONVERGENT PATHS

(71) Applicant: XILINX, INC., San Jose, CA (US)

(72) Inventors: Brian Guttag, San Jose, CA (US); Nitin Deshmukh, Monroe, WA (US); Sreesan Venkatakrishnan, San Jose, CA (US); Satish Sivaswamy, Fremont, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/316,584

(22) Filed: May 10, 2021

(51) Int. Cl.
*G06F 13/40* (2006.01)

(52) U.S. Cl.
CPC ...... *G06F 13/4022* (2013.01); *G06F 13/4059* (2013.01); *G06F 13/4086* (2013.01); *G06F 2213/0064* (2013.01)

(58) Field of Classification Search
CPC ............. G06F 13/4022; G06F 13/4059; G06F 13/4086; G06F 2213/0064; G06F 9/3885; G06F 11/2069; G06F 30/30; G06F 30/35; G06F 11/2076; G06F 11/2082
See application file for complete search history.

(56) References Cited

U.S. PATENT DOCUMENTS

| | | | | |
|---|---|---|---|---|
| 5,692,137 A * | 11/1997 | Regal | ..................... | G06F 13/405 710/52 |
| 6,542,469 B1 * | 4/2003 | Kelley | ..................... | H04L 45/00 370/468 |
| 7,376,767 B1 * | 5/2008 | Black | ................... | H04L 49/9047 370/467 |
| 8,001,504 B1 * | 8/2011 | Campbell | ........... | G06F 30/3312 716/108 |
| 2003/0076840 A1 * | 4/2003 | Rajagopal | ............... | H04L 45/28 370/465 |
| 2003/0112910 A1 * | 6/2003 | Yoh | ........................... | G06F 1/10 375/356 |
| 2006/0239333 A1 * | 10/2006 | Albert | ............... | H04W 72/0406 375/130 |

(Continued)

OTHER PUBLICATIONS

Benini et al., "Network on Chips: A New SoC Pardadigm", Jan. 2002, IEEE, all pages.*

(Continued)

*Primary Examiner* — Faisal M Zaman
(74) *Attorney, Agent, or Firm* — Patterson + Sheridan, LLP

(57) ABSTRACT

Embodiments herein describe techniques for preventing a stall when transmitting data between a producer and a consumer in the same integrated circuit (IC). A stall can occur when there is a split point and a convergence point between the producer and consumer. To prevent the stall, the embodiments herein adjust the latencies of one of the paths (or both paths) such that a maximum latency of the shorter path is greater than, or equal to, the minimum latency of the longer path. When this condition is met, this means the shortest path has sufficient buffers (e.g., a sufficient number of FIFOs and registers) to queue/store packets along its length so that a packet can travel along the longer path and reach the convergence point before the buffers in the shortest path are completely full (or just become completely full).

17 Claims, 12 Drawing Sheets

(56) References Cited

U.S. PATENT DOCUMENTS

| | | | |
|---|---|---|---|
| 2009/0288056 A1* | 11/2009 | Gitchev | G06F 30/394 |
| | | | 716/126 |
| 2009/0322392 A1* | 12/2009 | Miyamoto | H03L 7/0805 |
| | | | 327/158 |
| 2012/0087252 A1* | 4/2012 | Ansorge | H04L 43/0852 |
| | | | 370/252 |
| 2013/0070606 A1* | 3/2013 | Asaad | H04L 12/66 |
| | | | 370/241 |
| 2013/0336118 A1* | 12/2013 | Shaw | H04L 41/0813 |
| | | | 370/235 |
| 2014/0258618 A1* | 9/2014 | Novakovsky | G06F 12/0895 |
| | | | 711/118 |
| 2018/0131614 A1* | 5/2018 | Song | H04L 47/245 |
| 2018/0341602 A1* | 11/2018 | Venkataraman | G06F 13/1673 |
| 2020/0106710 A1* | 4/2020 | Ryoo | H04L 47/30 |
| 2020/0280750 A1* | 9/2020 | Nakamura | H04L 65/764 |
| 2022/0101086 A1* | 3/2022 | Cappetta | G06F 9/3806 |
| 2022/0188631 A1* | 6/2022 | Kindrat | G06N 3/04 |

OTHER PUBLICATIONS

Peng Li, J., et al., "Deadlock-free buffer configuration for streaming computing," International Journal of High Performance Computing Applications, Sep. 2017, vol. 31 (5), p. 441-450.

* cited by examiner

| RE-CONVERGENT SYSTEM # | RE-CONVERGENT SYSTEM'S POINT TO POINT | PATH MAKEUP | ORIGINAL SLACK VALUES |
|---|---|---|---|
| 0 | C → D | [ E0, E1 + E2 ] | 20 - 38 = -18 |
| 1 | C → G | [ { E0 + E5, E1 + E2 + E5 }, E1 + E2 + E3 + E4 ] | 58 - 78 = -20 |
| 2 | F → G | [ E5, E3 + E4 ] | 20 - 40 = -20 |

TABLE 1

FIG. 6

Minimize 0.001 C0 + 0.001 C1 + 0.001 C2 + 0.001 C3 + 0.001 C4 + y0 + y1 + y2

Subject To

\Min Latency of each path (each FIFO adds a minimum latency of 6 in the current architecture)

R0: minL0 - 6 F0 = 20 : Path C->D containing E0
R1: minL1 - 6 F1 - 6F2 = 38 \ Path C->D containing E1 and E2
R2: minL2 - 6 F0 - 6F5 = 60 \ Path C->G containing E0 and E5
R3: minL3 - 6 F1 - 6F2 - 6F5 = 78 \ Path C->G containing E1, E2 and E5
R4: minL4 - 6 F1 - 6F2 - 6F3 - 6F4 = 58 \ Path C->G containing E1, E2, E3 and E4
R5: minL5 - 6F5 = 40 \ Path F->G containing E5
R6: minL6 - 6F3 - 6F4 = 20 \ Path F->G containing E3 and E4

\Max (non-stalling) latency of each path (each FIFO adds a non-stalling maximum latency of 19 in the current architecture)

R7: maxL0 - 19 F0 = 20
R8: maxL1 - 19 F1 - 19 F2 = 38
R9: maxL2 - 19 F0 - 19 F5 = 60
R10: maxL3 - 19 F1 - 19 F2 - 19 F5 = 78
R11: maxL4 - 19 F1 - 19 F2 - 19 F3 - 19 F4 = 58
R12: maxL5 - 19 F5 = 40
R13: maxL6 - 19 F3 - 19 F4 = 20

Slack Equations

R14: shortMax0 - longMin0 - slack0 = 0
R15: shortMax1 - longMin1 - slack1 = 0
R16: shortMax2 - longMin2 - slack2 = 0

Bounds:

F0 >= 0
F1 >= 0
F2 >= 0
F3 >= 0
F4 >= 0
F5 >= 0

Integers

F0 F1 F2 F3 F4 F5 C0 C1 C2 C3 C4 C5

General Constraints

\longest minimum latency path and shortest maximum latency path for a re-convergent point GC1: longMin0 = MAX ( minL0, minL1 )
GC2: longMin1 = MAX ( minL2, minL3, minL4 )
GC3: longMin2 = MAX ( minL5, minL6 )

GC7: shortMax0 = MIN ( maxL0, maxL1 )
GC8: shortMax1 = MIN ( maxL2, maxL3, maxL4 )
GC9: shortMax2 = MIN ( maxL5, maxL6 )

\slack piecewise linear functions for increasing positive slack up to a point ( see Fig.6 for further explanation )

GC12: y0 = PWL ( slack0 ) : (-1, 0) (0, 60) (60, 0) (61, 0)
GC13: y1 = PWL ( slack1 ) : (0, 60) (60, 0) (61, 0)
GC14: y2 = PWL ( slack2 ) : (0, 60) (60, 0) (61, 0)

Cost per FIFO ( we want to distribute FIFO's across all edges on a path based on some input info., see Fig. 7 )

GC18: C0 = PWL ( F0 ) : (-1, 0) (0, 0) (1, 1) (2, 3) (3, 6) (4, 10)
GC19: C1 = PWL ( F1 ) : (-1, 0) (0, 0) (1, 1) (2, 3) (3, 6) (4, 10)
GC20: C2 = PWL ( F2 ) : (-1, 0) (0, 0) (1, 1) (2, 3) (3, 6) (4, 10)
GC21: C3 = PWL ( F3 ) : (-1, 0) (0, 0) (1, 1) (2, 3) (3, 6) (4, 10)
GC22: C4 = PWL ( F4 ) : (-1, 0) (0, 0) (1, 1) (2, 3) (3, 6) (4, 10)
GC23: C5 = PWL ( F5 ) : (-1, 0) (0, 0) (1, 1) (2, 3) (3, 6) (4, 10)

OPTIMIZING HARDWARE DESIGN THROUGHPUT BY LATENCY AWARE BALANCING OF RE-CONVERGENT PATHS

TECHNICAL FIELD

Examples of the present disclosure generally relate to optimizing paths between a producer and a consumer such that split and convergence points do not cause backpressure that can result in a stall.

BACKGROUND

Designers typically plan for compute kernel latencies and try to ensure that there are no recurring stalls in the design. However, a routing interconnect can add latencies when going through switches that are unknown to the designer until after the placement and routing stage. This means that designers have no good way to consider these factors when producing their designs.

SUMMARY

One embodiment describes a computing system that includes a non-transitory computer readable medium having program instructions embodied therewith, the program instructions executable by a processor to perform an operation. The operation includes identifying a split point and a convergence point between a consumer and producer where the consumer and producer are functions executed by a processing circuit in an integrated circuit, identifying a shorter path and a longer path extending between the split point and the convergence point, upon determining that the shorter path has a maximum latency that is less than a minimum latency of the longer path, at least one of (i) determining an amount of buffering to add into at least one of the shorter path and the longer path or (ii) changing a distance between the producer and consumer, until the maximum latency on the shorter path is greater than or equal to the minimum latency of the longer path, and configuring a configurable interconnect in the integrated circuit to implement the shorter and longer paths.

Another embodiment described herein is a computing system that includes a processor and a memory with an application that when executed by the processor performs an operation. The operation includes identifying a split point and a convergence point between a consumer and producer where the consumer and producer are functions executed by a processing circuit in an integrated circuit, identifying a shorter path and a longer path extending between the split point and the convergence point, upon determining that the shorter path has a maximum latency that is less than a minimum latency of the longer path, at least one of (i) determining an amount of buffering to add into at least one of the shorter path and the longer path or (ii) changing a distance between the producer and consumer, until the maximum latency on the shorter path is greater than or equal to the minimum latency of the longer path, and configuring a configurable interconnect in the integrated circuit to implement the shorter and longer paths.

Another embodiment described herein is a method that includes identifying a split point and a convergence point between a consumer and producer, wherein the consumer and producer are functions executed by a processing circuit in an integrated circuit, identifying a shorter path and a longer path extending between the split point and the convergence point, upon determining that the shorter path has a maximum latency that is less than a minimum latency of the longer path, at least one of (i) determining an amount of buffering to add into at least one of the shorter path and the longer path or (ii) changing a distance between the producer and consumer, until the maximum latency on the shorter path is greater than or equal to the minimum latency of the longer path, and configuring a configurable interconnect in the integrated circuit to implement the shorter and longer paths.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 6 is a table corresponding to FIG. 5, according to an example.

FIG. 8 is pseudo code corresponding to the flowchart in FIG. 7, according to an example.

DETAILED DESCRIPTION

Figure 1:
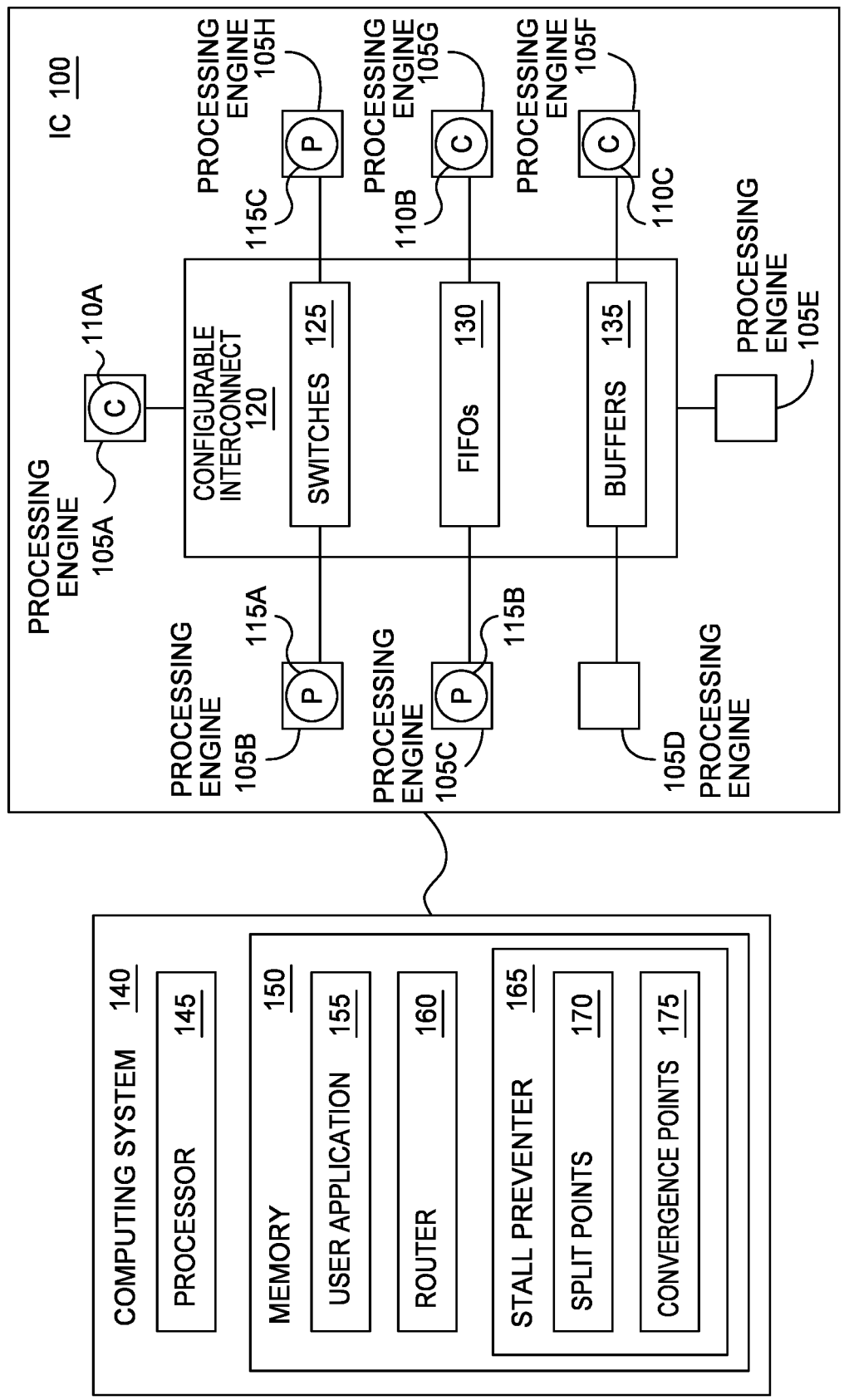
FIG. 1 is a block diagram a system for mitigating stalls between producers and consumers in an integrated circuit, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for preventing a stall when transmitting data between a producer (e.g., a function executing on a first processing engine) and a consumer (e.g., a function executing on a second processing engine) in the same integrated circuit (IC). A stall can occur when there is a split point and a convergence point between the producer and consumer. That is, the route between the producer and consumer has two parallel paths. If the latency for the two paths between the split and convergence points are the exact same, then a stall will not occur, but this is hardly ever the case. If the latencies differ, then backpressure can reach the split point which results in a stall (i.e., where the hardware element at the split point has to wait before it can inject the next packet into the two parallel paths).

To prevent the stall, the embodiments herein adjust the latencies of one of the paths (or both paths) such that a maximum latency of the shorter path is greater than, or equal to, the minimum latency of the longer path. When this condition is met, this means the shortest path has sufficient buffers (e.g., a sufficient number of FIFOs and registers) to queue/store packets along its length so that a packet can travel along the longer path and reach the convergence point before the buffers in the shortest path are completely full (or just become completely full). Stated differently, the shorter path has sufficient buffering to store packets received at the split point in its buffers while waiting for the first packet to traverse the longer path and reach the convergence point. As a result, backpressure in the shorter path never reaches the split point, and thus, never causes a stall at the split point. Once the first packet traverses the longer path, this packet can be combined with the first packet that traversed the shorter path (which was waiting at an end-of-the-line buffer in the shorter path) at the convergence point and transmitted to the consumer. In another embodiment, backpressure can be caused by the consumer wanting the packet from the longer path first, before it consumes the packet transmitted on the shorter path.

FIG. 1 is a block diagram a system for mitigating stalls between producers 115 and consumers 110 in an IC 100, according to an example. FIG. 1 includes a computing system 140 communicatively coupled to the IC 100. In general, the computing system 140 is tasked with configuring the hardware in the IC 100 to execute the producers 115 and consumers 110 (e.g., mathematical functions, data processing functions, etc.). As shown, the producers 115 and consumers 110 are executed on processing engines 105 in the IC 100. The processing engines 105 (e.g., kernels or processing circuits) are circuitry and can include hardened logic or programmable logic. Example of hardened processing engines 105 can include processors, mathematical operators (e.g., multiple accumulators (MAC)), digital signal processing engines, cryptographic engines, Forward Error Correction (FEC) engines, or other specialized hardware for performing one or more specialized tasks. Alternatively, the processing engines 105 can be blocks of programmable logic that can be configured to execute the producers or consumer assigned to it.

In this example, a producer 115 generates data that is transmitted to at least one consumer 110 executing on a different processing engine 105. As a result, once the producers 115 and consumers 110 are assigned to the processing engines 105, the computing system 140 also determines how to route data between the producers 110 and consumers 115. In this example, the IC 100 includes a configurable interconnect 120 that is configurable to make connections between the processing engines 105. That is, the hardware forming the configurable interconnect 120 (e.g., switches 125, FIFOs 130, and buffers 135) can be configured to make connections between different processing engines. For example, in a first configuration, the interconnect 120 may connect the producer 115A in the processing engine 105B to the consumer 110C in the engine 105F. However, the computing system 140 may later reconfigure the IC 100 such that the interconnect 120 instead connects the processing engine 105B to the processing engine 105G.

In one embodiment, the configurable interconnect 120 is able to connect any one of the processing engines 105 to any other one of the engines 105. However, in another embodiment, the interconnect 120 may be able to connect a processing engine 105 to only a subportion of the processing engines 105. In any case, the configurable interconnect 120 has flexible routing so that the computing system 140 can, during a routing phase, connect different processing engines 105 depending on how the producers and consumers were assigned during a placement stage. In this manner, the IC 100 is much more flexible than a typical application specific integrated circuit (ASIC) where the paths or routes between processing engines are fixed.

The computing system 140 includes a processor 145 that represents any number of processing elements with any number of cores and memory 150 that can include volatile memory, non-volatile memory, and combination thereof. As shown, the memory 150 includes a user application 155 (e.g., a software application) that uses the producers and consumers in the IC 100 to perform a desired function. For example, the IC 100 may be a hardware accelerator that is used by the user application 155 to offload specific tasks which are performed by the producers 115 and consumers 110 executing on the processing engines 105.

The memory 150 also includes a router 160 (e.g., a software application) for configuring the interconnect 120 such that the producers 115 can route data to the consumers 110. This routing function may be performed after the consumers 110 and the producers 115 have been placed or assigned to the processing engines 105. Based on this placement, the router 160 sets the routes through the configurable interconnect using the switches 125, FIFOs 130, and buffers 135. The routing information can be transmitted as a bitstream from the computing system 140 to the IC 100 which configures the interconnect 120.

The memory 150 also includes a stall preventer 165 (e.g., a software application) that looks for paths between the producers 115 and consumers 110 that might stall during runtime. One way a stall condition can occur is when a route between a producer 115 and a consumer 110 has, at some location along the route, a split point 170 where data is duplicated and transmitted on two paths, and a convergence point 175 where the data is recombined from the two paths before being received by the consumer 110. If the shorter path does not have sufficient buffering to store the packets until the packets can traverse the longer path and reach the convergence point 175, then backpressure reaches the switching element at the split point 170 causing this element to stall (e.g., wait). In contrast, if the shorter path can buffer packets without backpressure reaching the split point, the switching element at the switch point 170 does not stall. That is, each cycle, the switch point 170 can inject a packet into both the longer and shorter paths without waiting (assuming there is a packet available). Eventually, the packets traverse the longer path where they then can be combined with their corresponding packets that were queued in the shorter path. The combined packets can then be transmitted to the consumer 110. The details of the stall preventer 165 are described in more detail below.

Figure 2:
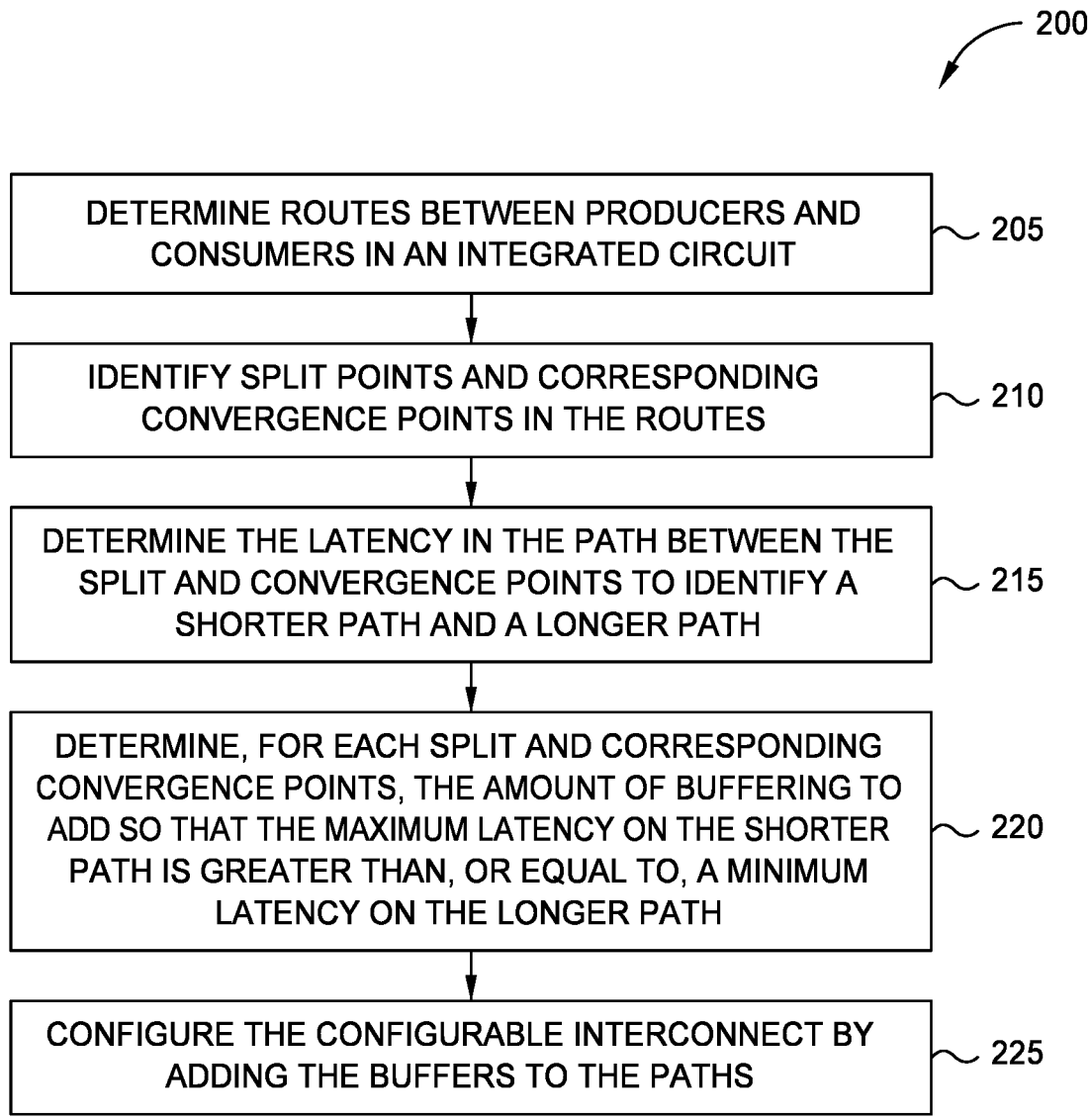
FIG. 2 is flowchart for adjusting buffering in paths between split and convergence points to mitigate stalls, according to an example.

FIG. 2 is flowchart of a method 200 for adjusting buffering in paths between split and convergence points to mitigate stalls, according to an example. At block 205, the router determines routes between producers and consumers in an IC that has a configurable interconnect (e.g., the configurable interconnect 120 in FIG. 1). In one embodiment, the router (or another application) has already assigned the producers and consumers to certain processing engines in the IC. The router then determines paths through the configurable interconnect so that a producer on one processing engine can transmit data to a consumer in a different process engine. The embodiments herein at not limited to any particular type of routing algorithm or application.

Further, the roles of consumer and producer may switch. For example, a first producer may transmit data to a first consumer, which processes the data and transmits it to a second consumer. In that case, the first consumer is also a producer since it produces data for the second consumer but also consumes data from the first producer. Thus, one of ordinary skill in the art will recognize that the functions performed by the producers and consumers can both consume and produce data.

At block 210, the stall preventer identifies split points and corresponding convergence points in the routes. That is, between a particular producer and consumer, the data may be split (e.g., replicated) and transmitted on two different paths. Eventually the two paths converge at a convergence point where the data packets are recombined and transmitted to the consumer.

In one embodiment, the stall preventer builds a graph illustrating the data flow between the processing engines using the routes established by the router. The stall preventer can parse the graph to identify the split and convergence points. However, the embodiments are not limited to any particular technique for identifying the split and convergence points between a producer and consumer. Furthermore, a producer may transmit data for multiple consumers. In that case, a single split point can have multiple convergence paths, with two (or more) parallel paths between each of those convergence points.

Figure 3:
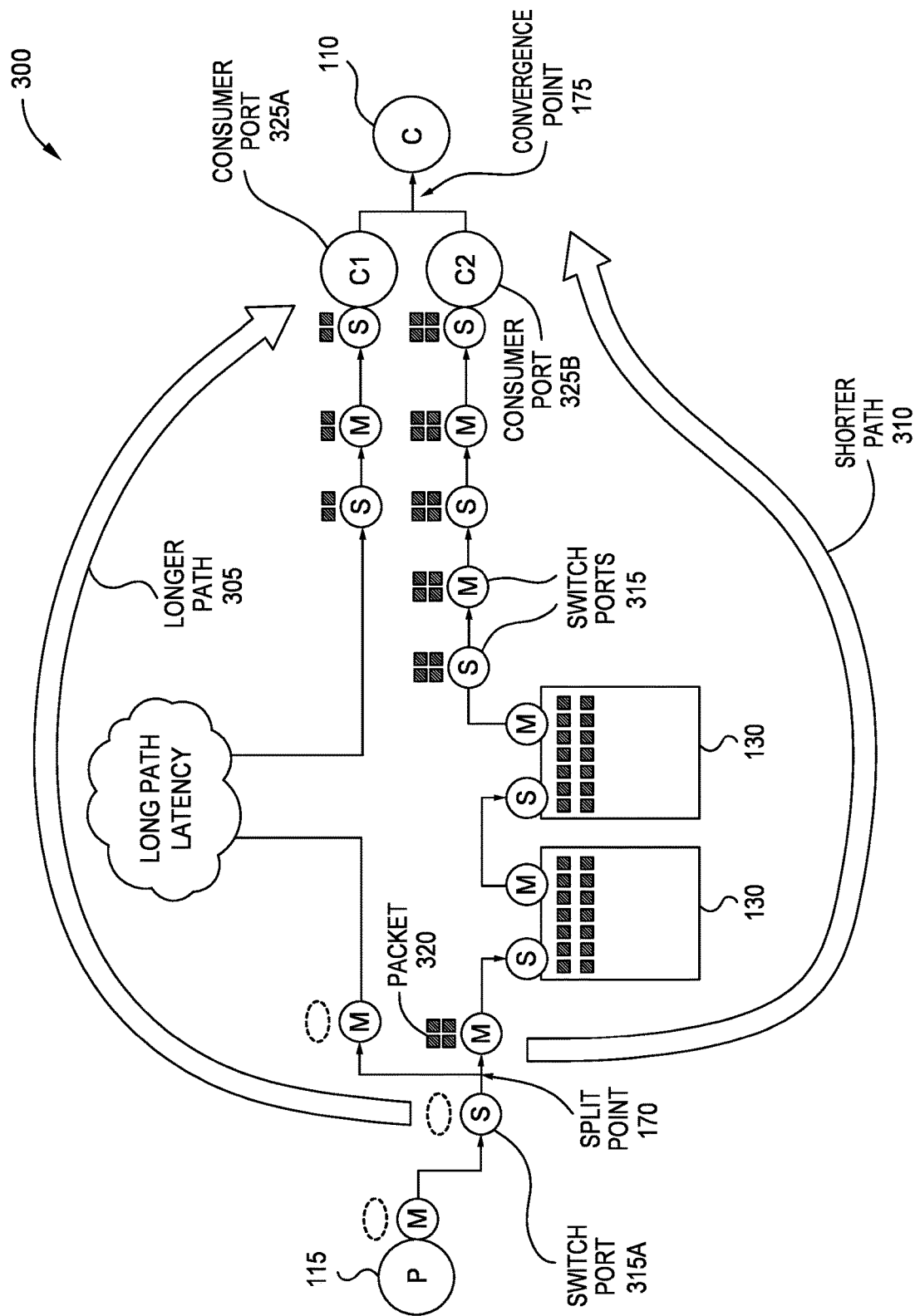
FIG. 3 illustrates how a stall occurs between a producer and a consumer, according to an example.
Figure 4:
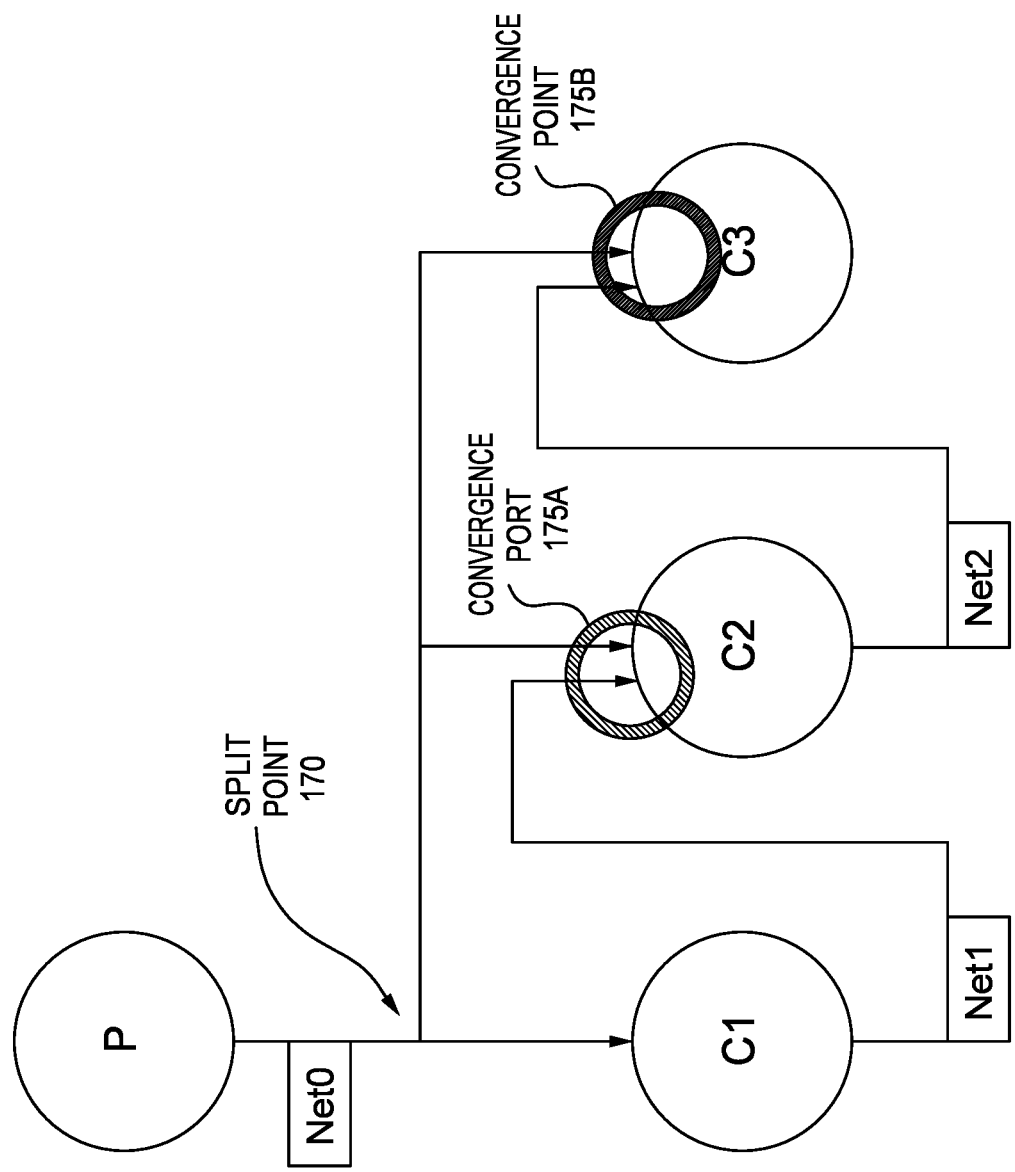
FIG. 4, illustrates a split point corresponding to multiple convergence points according to an example.
Figure 5:
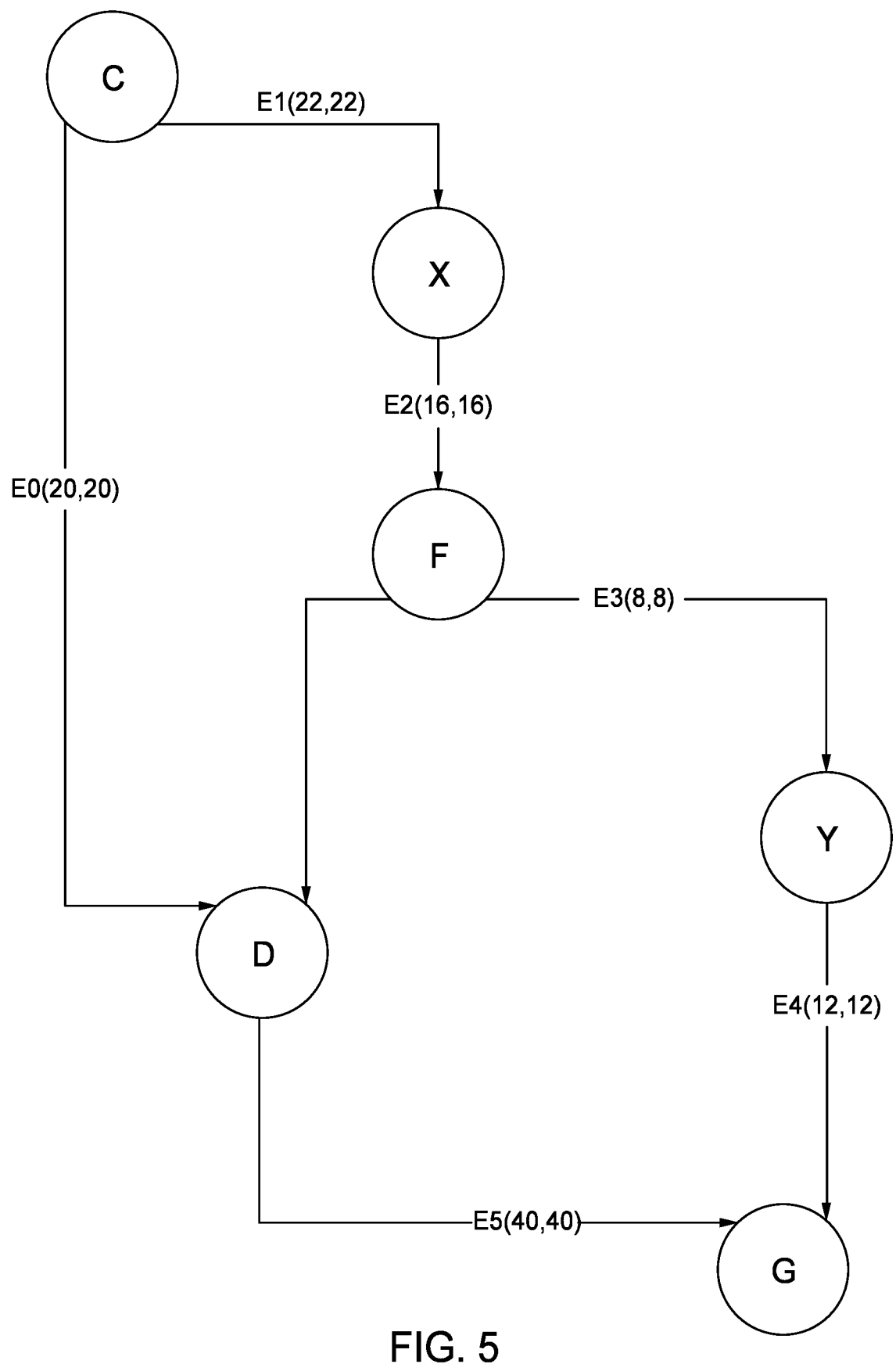
FIG. 5 illustrates latencies between consumers and producers, according to an example.

Split and convergence points may occur in a variety of situations such as when a producer broadcasts data to multiple consumers. The processed data then has to be recombined. This can often occur in convolution networks in neural networks. FIGS. 3-5 illustrate different applications where split and convergence points can occur.

To better understand how a stall can occur because of split and convergence points between a producer and consumer, FIG. 3 illustrates a basic scenario where a shorter path 310 does not have sufficient buffering to compensate for the latency of a longer path 305, according to an example. Because both paths 305, 310 have buffer elements (e.g., FIFOs 130 and switch ports 315), they also have a minimum and maximum latency. The minimum latency is the shortest amount of time it takes for a packet to traverse from the split point 170 to the convergence point 175. This occurs when the buffering elements in the path are empty. That is, the packet does not have to wait in a queue in a buffering element before it can be transmitted to the next downstream hardware element in the path (e.g., another switch or buffering element). In contrast, the maximum latency is the longest time it takes a packet to traverse the path. This occurs when the buffering elements already store other packets in their queues, but are not stalling. That is, some buffering elements have buffering schemes that can cause a stall where upstream elements cannot transmit data to the switching element even if there is space in the buffering element. The embodiments herein assume that the maximum latencies for the paths 305, 310 are maximum non-stalling latencies.

As a simplified example, assume a path between the split and convergence points has a single buffer that can store two packets. The minimum latency is two cycles since when the buffer is empty, in the first cycle the packet is received and stored in the buffer, and in the second clock cycle the packet is transmitted from the buffer to the convergence point. The maximum latency is three cycles because this assumes the buffer already has two packets stored in it. In the first cycle, it is assumed the buffer can transmit one of the two packet out which provides room so the packet can be stored in the buffer. However, on the second cycle the packet has to wait since there is another packet in front of it in the buffer's queue. On the third cycle, the packet is transmitted from the buffer to the convergence point. As another example, if the buffer can store three packets, then the minimum latency would still be two cycles, but the maximum (non-stalling) latency would be four cycles since the packet must wait for two packets that are in front of it in the queue.

In FIG. 3, the minimum and maximum latencies of the shorter path 310 are less than the corresponding minimum and maximum latencies of the longer path 305. This does not necessary result in a stall unless the maximum latency of the shorter path 310 is less than the minimum latency of the longer path 305. As an example, assume the maximum latency of the shorter path 310 is 30 clock cycles. This means the shorter path 310 has the buffering resources to store 30 packets 320 before the hardware element at the split point 170—i.e., the servant switch port 315A—cannot send any more packets to the shorter path 310. That is, after storing 30 packets, if the shorter path 310 is unable to begin transmitting packets into the convergence point 175 (because it is still waiting on the first packet to traverse the longer path 305), then the switch port 315A stalls. Stated differently, back pressure in the shorter path 310 reaches the split point 170 and causes a stall in the upstream switching element 315A.

If the minimum latency on the longer path 305 is equal to, or less than, 30 clock cycles, then there is not a stall at the split point 170. For example, assume the minimum latency of the longer path 305 is 29 clock cycles. That means, by the 29 clock cycle, the first packet introduced into the longer path 305 has reached the convergence point 175. In the meantime, the shorter path 310 has buffered 29 packets, waiting on the first packet to traverse the longer path 305. However, the shorter path 310 has sufficient buffering resources for these packets which means the split point 170 was able to inject a new packet into both the longer and short paths 305, 310 each of the 29 clock cycles. That is, the split point 170 does not stall. In the $30^{th}$ cycle, the first packet from the longer path 305 at the consumer port 325A can be combined with the first packet in the shorter path 310 at the consumer port 325B and transmitted to the consumer 110.

However, if the minimum latency of the longer path 305 was greater than 30, say 31 clock cycles, then on the $30^{th}$ clock cycle the buffering resources in the shorter path 310 inform the switch port 315A it is unable to receive any more packets 320. As such, the split point 170 stalls for one or more clock cycles until the packets can begin moving out of the shorter path 310 and to the consumer 110, which happens at the $31^{st}$ clock cycle when the first packet on the longer path 305 reaches the convergence point 175. In sum, to avoid stalling a split point, which can in turn stall the producer, the maximum latency of the shorter path should be greater than or equal to the minimum latency of the longer path.

Returning to FIG. 2, at block 215, the stall preventer determines the latency in the paths between the split and convergence points to identify the shorter and longer paths. In one embodiment, the stall preventer evaluates the buffer resources in the paths (e.g., FIFOs, buffers, switch buffers, etc.) to determine the maximum and minimum latencies on the path. From these latencies, the stall preventer can identify which path between a pair of split and convergence points is the shorter path (i.e., the path with the least latency) and which path is the longer path (i.e., the path with the greatest latency).

At block 220, the stall preventer identifies, for each split and corresponding convergence points, the amount of buffering that should be added so that a maximum latency on the shorter path is greater than, or equal to, a minimum latency on the longer path. That is, for the split and convergence points where the maximum latency on the shorter path is not greater than or equal to the minimum latency on the longer path, the stall preventer can add buffers into the path so this relationship is true. For the split and convergence points where this is already true, these routes can be left alone.

In one embodiment, the stall preventer uses an integer linear program (ILP) to solve for the various buffer amounts that should be added to the paths where the maximum latency on the shorter path is not greater than the minimum latency on the longer path. The ILP can solve these problems in parallel (where there are multiple pairs of splits and corresponding convergence points where this relationship is not satisfied). In one embodiment, the ILP has equations for the minimum and maximum latency of each given path in a system as well as a balancing equation for determining buffering amounts. One example of the balancing equation is shown in Equation 1:

$$L_i + X_i > L_j + Y_j \quad (1)$$

In Equation 1, $L_i$ is the non-stalling maximum latency of the shorter path i, $X_i$ is the non-stalling maximum latency provided by adding buffering onto the shorter path i, $L_j$ is the minimum latency of the longer path j, and $Y_j$ is the minimum latency provided by adding buffering on the longer path j. While the balancing Equation 1 illustrates adding buffering resources to both the longer and shorter paths, it may be feasible (and desirable) to just add buffering on the shorter path so this equation is true (i.e., $Y_j$ would be zero in that example). However, because buffering may have to be added in discrete units which may make what was the shorter path now the longer path, and because adding buffering can affect other split/convergence point pairs that share the same paths, the ILP may end up adding buffering onto both paths so that maximum latency on the shorter path is equal to or greater than the minimum latency of the longer path.

At block 225, the router adds the buffers identified at block 220 into the paths. As a result, the paths for every split/convergence point has a shorter path with a maximum latency that is greater than or equal to the minimum latency of the longer path. As a result, backpressure from the shorter path does not reach the split point and a stall condition does not reach the producer.

Figure 7:
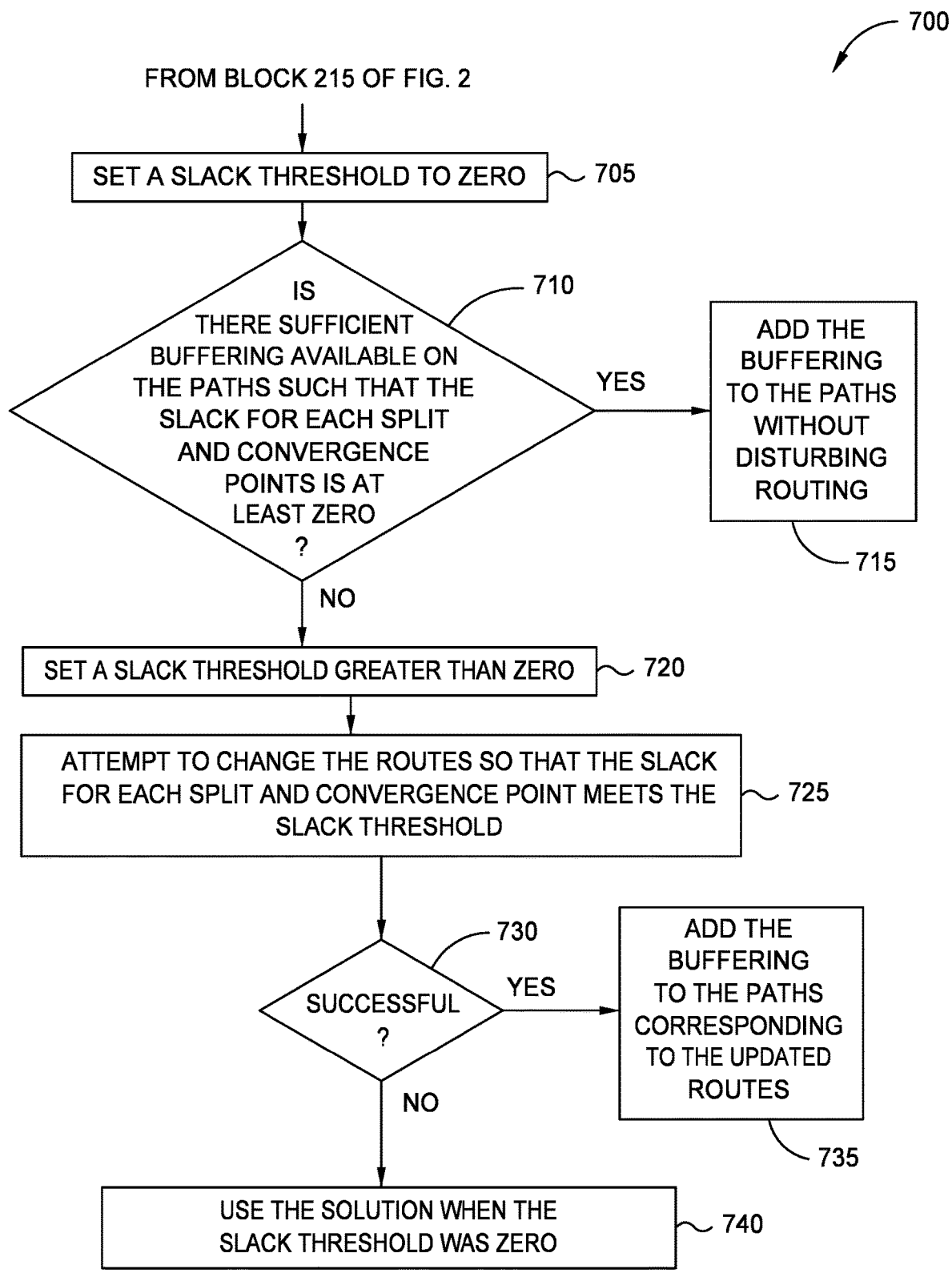
FIG. 7 is flowchart for adjusting buffering in paths between split and convergence points using multiple slack thresholds, according to an example.

The method 200 assumes that the configurable interconnect has the available buffers to ensure that the stall preventer can find a solution to Equation 1 for every pair of split/convergence points. This is not always the case since buffers may be a scarce resource. FIG. 7 illustrates a method that can be used when buffers are scarce.

FIG. 4, illustrates a split point corresponding to multiple convergence points according to an example. Here, a single producer P broadcasts data to multiple consumers C1-C3. Moreover, consumers C1 and C2 also serve as producers since C1 outputs processed data to C2, and C2 outputs processed data to C3. This results in the split point 170 having two convergence points 175A and 175B. In one example, the ILP may have two version of Equation 1, one for the split point 170 and the convergence point 175A and another for the split point 170 and the convergence point 175B. Moreover, these two systems have paths that overlap—i.e., the portion of the path between the split point 170 and the convergence point 175A. Thus, if the stall preventer adds any buffering to this portion when attempting to solve Equation 1 for the split point 170 and convergence point 175A, this also affects the latency for the combination of the split point 170 and the convergence point 175B. Thus, the ILP will consider all systems with overlap in coming up with a single solution.

FIG. 5 illustrates latencies between consumers and producers, according to an example. FIG. 5 is discussed in tandem with FIG. 6 which illustrates a table 600 providing the latencies of the systems illustrated in FIG. 5. FIGS. 5 and 6 also introduce the idea of slack which is equal to the difference between the two sides of the balancing equation 1. Slack is expressed in Equation 2 as:

$$\text{Slack} = L_i + X_i - (L_j + Y_j) \quad (2)$$

Slack measures the amount of latency tolerance a convergence path has, before stalling can occur on that path. That is, if the maximum latency on the shorter path equals the minimum latency on the longer path, than the slack is zero. Stated differently, there is no tolerance in the latencies. However, if the slack is positive, this means that the maximum latency on the shorter path is greater than the minimum latency on the longer path, which means there is more buffering in the shorter path than is technically needed to prevent a stall. On the other hand, if the slack is negative, this means a stall may occur (depending on the consumption and production rates) at the split point since the maximum latency of the shorter path is less than the minimum latency on the longer path. Slack becomes especially important when handling implementations where the buffering resources are scarce.

In FIG. 5, the edges E0-E5 of each path are labeled along with the minimum and maximum latencies and their slack in table 600. To increase maximum latencies such that the system becomes balanced, buffering is added to all systems. In this case, buffers should be added on E0 for System 0, buffers should be added to the path defined by E1+E2+E3+E4 for System 1, buffers should be added to the path defined by E3+E4 for System 2. As a result, the negative, original slack values can be converted into positive (or zero) slack values.

FIG. 7 is flowchart of a method 700 for adjusting buffering in paths between split and convergence points using multiple slack thresholds, according to an example. The method 700 begins after block 215 of FIG. 2 where the stall preventer has determined the latencies corresponding to the shorter and longer paths for each pair of split and convergence points. To attempt to make the slack at least zero for each of these pairs, the method 700 performs two passes. The first pass begins at block 705 where the stall preventer sets a slack threshold to zero. As discussed above, a slack of zero is the minimum slack that ensures the split point does not stall.

At block 710, the stall preventer determines whether there is sufficient buffering available on the paths such that the slack for each split and convergence points is at zero—i.e., satisfies the slack threshold. That is, for every pair of split and convergence point where the current slack is negative (i.e., the maximum latency on the shorter path is less than the minimum latency of the longer path), the stall preventer determines whether there is sufficient buffering along one (or both) of the paths so that the slack can be improved to zero. However, as mentioned above, these buffering resources are finite and the interconnect may not have sufficient resources along the current paths to raise the slack to zero.

Assuming there are sufficient resources along the paths to ensure each pair of split and convergence points has zero slack (or more), the method 700 proceeds to block 715 where the router adds the buffering to the paths without disturbing the routing. That is, the buffering can be added to the paths using the current routes. In that case, the method 700 can end since the stall preventer has found a solution where there are no stalls.

However, assuming there is not enough buffering for at least one of the pairs of split and convergence points so that their slack is at least zero, the method 700 proceeds to block 720 where the stall preventer sets a slack threshold greater than zero. Setting a larger slack threshold builds more flexibility into the system so that slack will still be zero even after the routes have to be changed. That is, because the first pass failed, increasing the slack threshold hopefully means the actual slack for the split and convergence points will be positive (or at least zero) after the router has rerouted any paths where there is not currently sufficient buffering.

In one embodiment, the positive slack threshold may be set knowing how many buffers are available in the system. Alternatively, the positive slack threshold set at block 720 may be a predefined threshold for what an ideal slack should be such that if the paths have to be re-routed, the slack will still be positive (or at least zero).

At block 725, the stall prevent and the router attempt to change the routes so that the slack for each split and convergence points meets the new slack threshold. The same slack and balancing equations used during the first pass (and in the method 200) can be used during the second pass. Unlike during the first pass, the second pass tries to exceed the necessary amount of buffering. This extra amount of buffering creates a large positive slack that can better accommodate routing detours. This technique has the advantage of addressing large imbalances in the path latencies and the ILP formulation tries to tradeoff hardware resources with slack by simultaneously optimizing both factors. By ripping up and trying new routes, the final solution may ensure that all the split and convergence points have a zero or greater slack.

Figure 9:
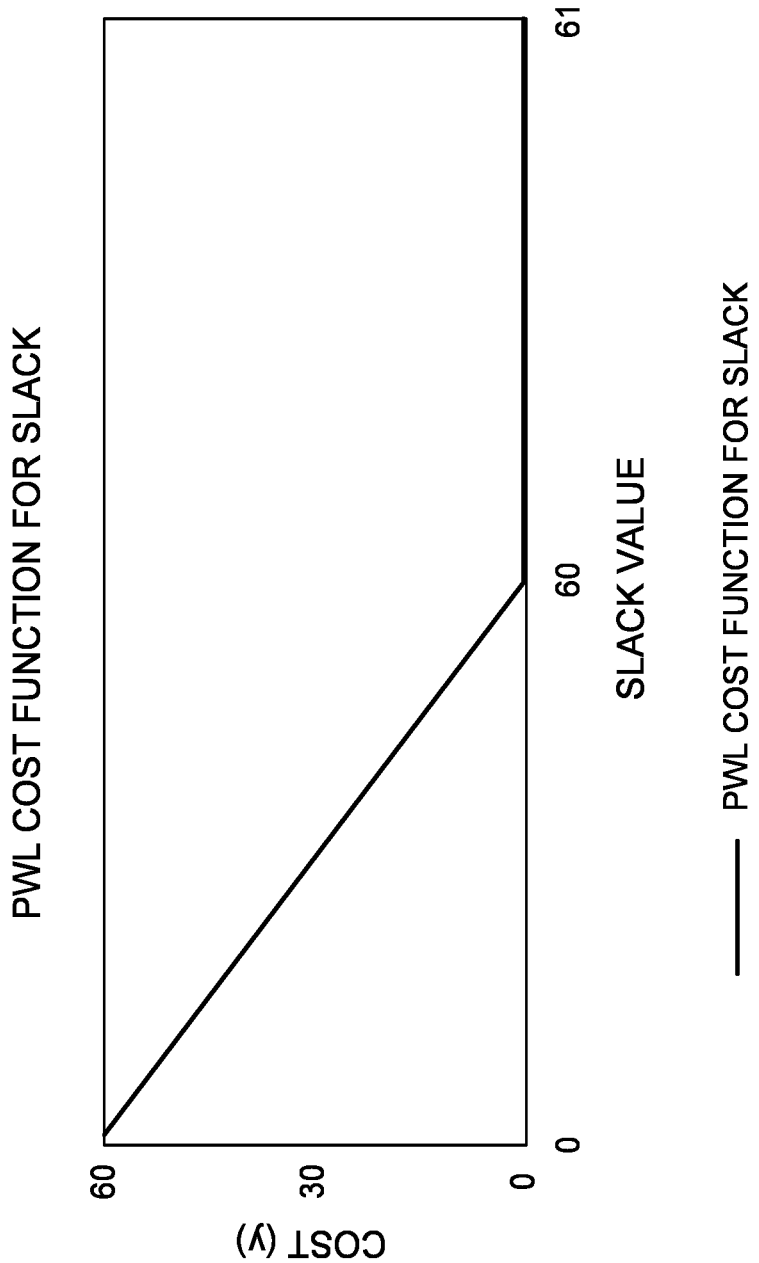
FIG. 9 is a cost function for setting a slack threshold, according to an example.
Figure 10:
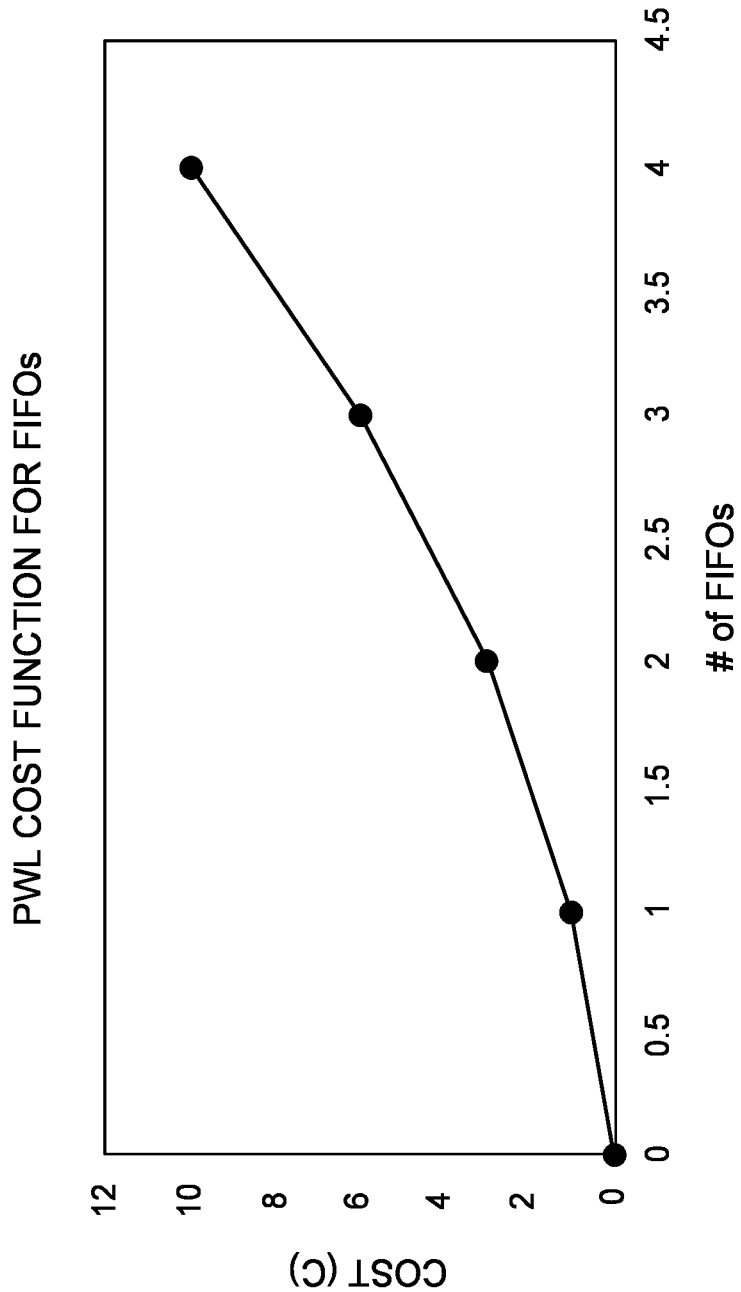
FIG. 10 is a cost function for FIFOs, according to an example.

The ILP equations for the second pass, based on the design in FIG. 5, are shown in pseudocode in FIG. 8. In FIG. 8, minL and maxL refer to the minimum and maximum latencies of individual paths, respectively. For example, minL0 refers to the minimum latency of the path created by the edge between C and D. To represent the number of FIFOs used on a given edge, an F# is given corresponding to the edge's number. For example, E0 will have as many FIFOs as the value of F0. The objective of the ILP in FIG. 5 is to minimize the costs that are based on the slack and FIFO amounts. These cost values are created based on piecewise linear functions described graphically in FIGS. 9 and 10. The major objective of ILP is to find a solution that maximizes slack up to a certain threshold. After reaching the threshold the cost for increasing slack will no longer decrease. In a similar fashion, since the stall preventer may attempt to keep the buffer utilization (e.g., FIFO utilization) low, a piecewise linear function with increasing cost with number of buffer can be used. The numbers used for the X and Y values in the graphs in FIGS. 9 and 10 may change based upon design requirements and original slack numbers.

Returning to FIG. 7, if at block 730 the stall preventer and router were able to determine routes for the split and convergence points where their slack values are equal to or greater than zero, the method 700 proceeds to block 735 where the stall preventer adds the buffering to the paths corresponding to the updated routes. In this scenario, there is no stalling at the split points.

However, if there is at least one split and convergence point that has a negative slack, the method 700 proceeds to block 740 where the stall preventer uses the solution when the slack threshold was zero—i.e., the solution found at block 710. This recognizes that some of the split points may stall, but this also reduces the buffer utilization relative to the solution determined at block 725 with a positive slack threshold so that other entities in the IC can use those buffers.

Figure 11:
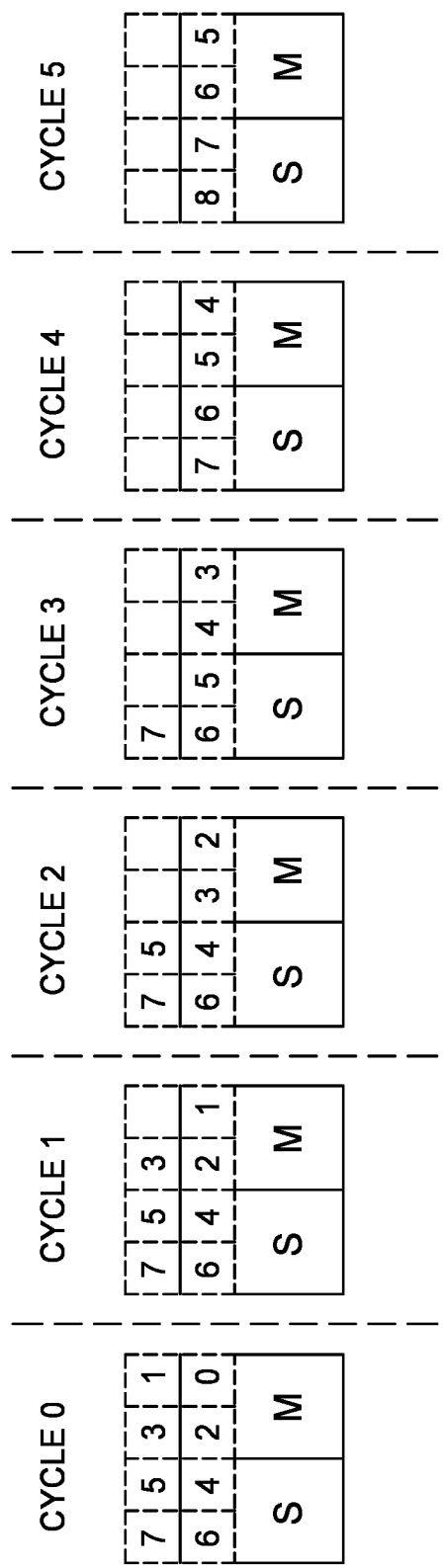
FIG. 11 illustrates the states of switch ports over time, according to an example.

FIG. 11 illustrates the states of switch ports over time, according to an example. The switch ports may be the switch ports 315 in FIG. 3. In this example, a switch port is made up of two register slices each with a depth of two. Before data can move from one register to the next the next register must have an empty space to receive the data. In one cycle if a register is full it will not take another piece of data even if that register outputs a piece of data. In FIG. 11, the movement of data through two switch ports, servant and master, is shown. At cycle 0 both switch ports are filled with data, packets 0-7. Cycle 1 sees the output of one packet of data but notice that packet 2 does not move in its position. This is because at the start of the cycle, before packet 0 has moved, the register is viewed as full and therefore cannot take in any more packets. Only after all the additional buffers are emptied does the system being to take in new packets (i.e., packet 8).

Figure 12:
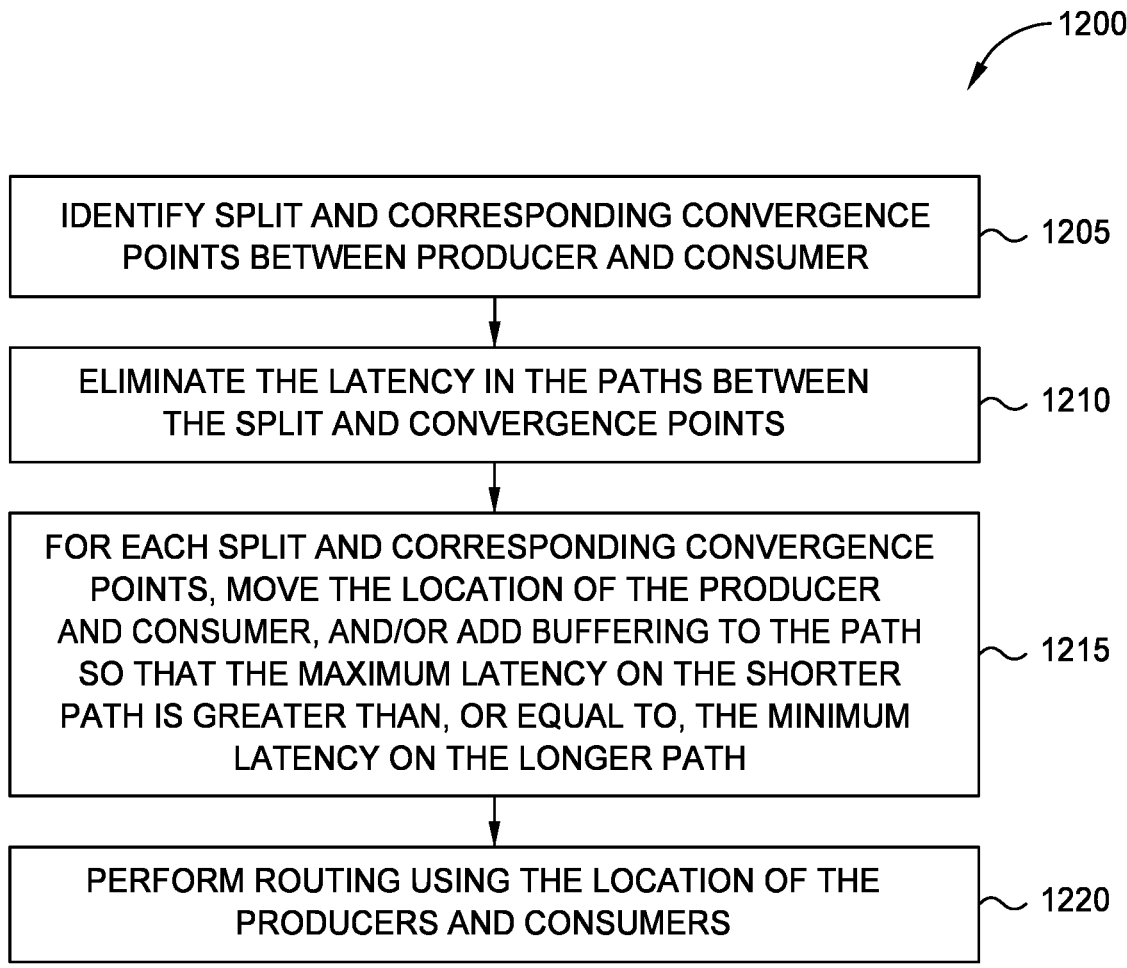
FIG. 12 is a flowchart for latency in paths between split and convergence points to mitigate stalls before routing has been performed, according to an example.

FIG. 12 is a flowchart of a method 1200 for latency in paths between split and convergence points to mitigate stalls before routing has been performed, according to an example. While the methods in FIGS. 2 and 7 perform an initial routing before determining where to add buffering, the method 1200 first attempts to ensure the split and convergence points have sufficient slack before performing routing.

At block 1205, the stall preventer identifies the split and convergence points between the producers and consumers. At this stage, the split and convergence points can be identified without know the exact locations of the producers and consumers on the IC, or the routes used by the paths connecting the producers and consumers.

At block 1210, the stall preventer estimates the latency in the paths between the split and convergence points. Unlike in FIGS. 2 and 7 where the latency can be accurately measured (since the routes are already known), here the stall preventer estimates the latency in the paths. This estimation may be based on a predicted distance between the split and convergence points, or historical data.

At block 1215, the stall preventer moves, for each split and corresponding convergence points, the locations of the producers and consumers or adds buffering to the paths so that the maximum latency of the shorter path is greater than or equal to the minimum latency on the longer path. The advantage of the method 1200 over the previous methods is that the locations of the producers and consumers are not fixed. Thus, method 1200 provides an additional tool to the stall preventer where it can change the estimated distances between the producers and consumers which can change the slack for the corresponding split and convergence points. In one embodiment, the method 1200 may be performed by only adjusting the location of the consumer and producers so that the slack is greater than or equal to zero. In another embodiment, the method 1200 may use a combination of moving the producers and consumers and adding buffers to the paths. Thus, method 1200 may result in less buffer utilization than the methods in FIGS. 2 and 7, although it may be more difficult to identify a solution since the routes are not yet fixed.

At block 1220, the router performs routing using the locations of the producers and consumers. For example, the stall preventer may use the locations it identifies as constraints on a tool so that the tool places the consumer and producers in a manner that should ensure the maximum latency on the shorter path between the split and convergence points is greater than or equal to the minimum latency on the longer path.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A non-transitory computer readable medium having program instructions embodied therewith, the program instructions executable by a processor to perform an operation, the operation comprising:
    identifying a split point and a convergence point between a consumer and producer, wherein the consumer and producer are functions executed by a processing circuit in an integrated circuit;
    identifying a shorter path and a longer path extending between the split point and the convergence point;
    performing routing to set locations of the producer and consumer in the integrated circuit and determine routes for the shorter and longer paths through a configurable interconnect, wherein the shorter and longer paths have both a known minimum latency and a known maximum latency;
    upon determining that the shorter path has a maximum latency that is less than a minimum latency of the longer path, at least one of (i) determining an amount of buffering to add into at least one of the shorter path and the longer path or (ii) changing a distance between the producer and consumer, until the maximum latency on the shorter path is greater than or equal to the minimum latency of the longer path; and
    configuring the configurable interconnect in the integrated circuit to implement the shorter and longer paths.

2. The non-transitory computer readable medium of claim 1, wherein the maximum latency is the number of clock cycles required for a packet to traverse the shorter path when buffering resources in the shorter path are full, but without stalling, and the minimum latency is the number of clock cycles required for a packet to traverse the longer path when buffering resources in the longer path are empty.

3. The non-transitory computer readable medium of claim 1, wherein the split point replicates a packet and transmits the replicated packet on both the shorter and longer paths, wherein the convergence point combines packets received from both the shorter and longer paths into a single packet.

4. The non-transitory computer readable medium of claim 1, the operation further comprising:
    setting a slack threshold to zero when determining the amount of buffering to add into at least one of the shorter path and the longer path, wherein a slack between the split and convergence points indicates a tolerance between the maximum latency of the shorter path and the minimum latency of the longer path.

5. The non-transitory computer readable medium of claim 4, the operation further comprising:
    upon determining that there are insufficient buffering resources along at least one of the shorter and longer paths such that the slack can meet the slack threshold, increasing the slack threshold to a positive value; and
    re-rerouting the shorter and longer paths to identify routes in the configurable interconnect that do have sufficient buffering resources for satisfying the slack threshold.

6. The non-transitory computer readable medium of claim 1, wherein determining the amount of buffering to add into at least one of the shorter path and the longer path is performed using a integer linear program.

7. The non-transitory computer readable medium of claim 1, the operation further comprising, after at least one of (i) determining the amount of buffering to add into at least one of the shorter path and the longer path or (ii) changing the distance between the producer and consumer:
    performing routing to set locations of the producer and consumer in the integrated circuit and determine routes for the shorter and longer paths through the configurable interconnect.

8. A computing system, comprising:
    a processor; and
    memory comprising an application, which when executed by the processor, performs an operation, the operation comprising:
        identifying a split point and a convergence point between a consumer and producer, wherein the consumer and producer are functions executed by a processing circuit in an integrated circuit;
        identifying a shorter path and a longer path extending between the split point and the convergence point;
        performing routing to set locations of the producer and consumer in the integrated circuit and determine routes for the shorter and longer paths through a configurable interconnect, wherein the shorter and longer paths have both a known minimum latency and a known maximum latency;
        upon determining that the shorter path has a maximum latency that is less than a minimum latency of the longer path, at least one of (i) determining an amount of buffering to add into at least one of the shorter path and the longer path or (ii) changing a distance between the producer and consumer, until the maximum latency on the shorter path is greater than or equal to the minimum latency of the longer path; and
        configuring the configurable interconnect in the integrated circuit to implement the shorter and longer paths.

9. The computing system of claim 8, wherein the maximum latency is the number of clock cycles required for a packet to traverse the shorter path when buffering resources in the shorter path are full, but without stalling, and the minimum latency is the number of clock cycles required for a packet to traverse the longer path when buffering resources in the longer path are empty.

10. The computing system of claim 8, wherein the split point replicates a packet and transmits the replicated packet on both the shorter and longer paths, wherein the convergence point combines packets received from both the shorter and longer paths into a single packet.

11. The computing system of claim 8, the operation further comprising:

setting a slack threshold to zero when determining the amount of buffering to add into at least one of the shorter path and the longer path, wherein a slack between the split and convergence points indicates a tolerance between the maximum latency of the shorter path and the minimum latency of the longer path.

12. The computing system of claim 11, the operation further comprising:

upon determining that there are insufficient buffering resources along at least one of the shorter and longer paths such that the slack can meet the slack threshold, increasing the slack threshold to a positive value; and re-rerouting the shorter and longer paths to identify routes in the configurable interconnect that do have sufficient buffering resources for satisfying the slack threshold.

13. The computing system of claim 8, wherein determining the amount of buffering to add into at least one of the shorter path and the longer path is performed using a integer linear program.

14. The computing system of claim 8, the operation further comprising, after at least one of (i) determining the amount of buffering to add into at least one of the shorter path and the longer path or (ii) changing the distance between the producer and consumer:

performing routing to set locations of the producer and consumer in the integrated circuit and determine routes for the shorter and longer paths through the configurable interconnect.

15. A method, comprising:

identifying a split point and a convergence point between a consumer and producer, wherein the consumer and producer are functions executed by a processing circuit in an integrated circuit;

identifying a shorter path and a longer path extending between the split point and the convergence point;

performing routing to set locations of the producer and consumer in the integrated circuit and determine routes for the shorter and longer paths through a configurable interconnect, wherein the shorter and longer paths have both a known minimum latency and a known maximum latency;

upon determining that the shorter path has a maximum latency that is less than a minimum latency of the longer path, at least one of (i) determining an amount of buffering to add into at least one of the shorter path and the longer path or (ii) changing a distance between the producer and consumer, until the maximum latency on the shorter path is greater than or equal to the minimum latency of the longer path; and configuring the configurable interconnect in the integrated circuit to implement the shorter and longer paths.

16. The method of claim 15, wherein the maximum latency is the number of clock cycles required for a packet to traverse the shorter path when buffering resources in the shorter path are full, but without stalling, and the minimum latency is the number of clock cycles required for a packet to traverse the longer path when buffering resources in the longer path are empty.

17. The method of claim 15, wherein the split point replicates a packet and transmits the replicated packet on both the shorter and longer paths, wherein the convergence point combines packets received from both the shorter and longer paths into a single packet.

\* \* \* \* \*